July 9, 1940.  A. A. HOCHER  2,207,008
FASTENING OR ANCHORING MEANS FOR INSULATOR SUPPORTING PINS
Filed July 3, 1937
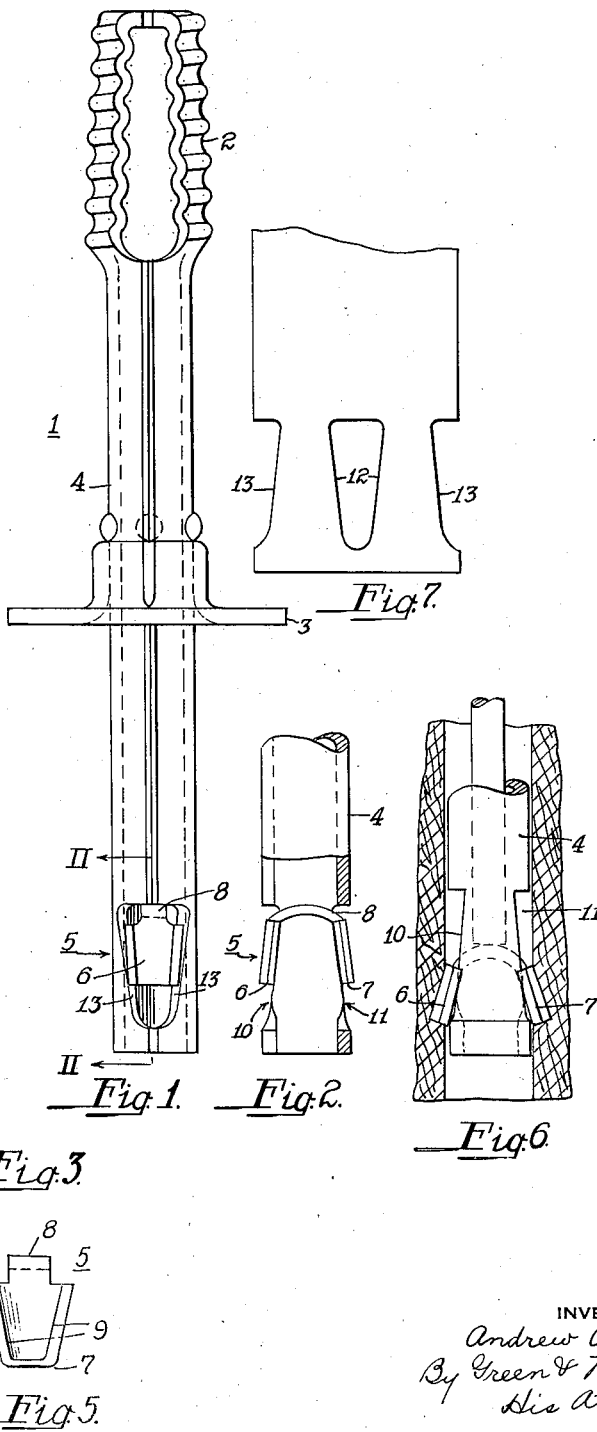
INVENTOR
Andrew A. Hocher
By Green & McCallister
His Attorneys Patented July 9, 1940

2,207,008

UNITED STATES PATENT OFFICE 2,207,008

FASTENING OR ANCHORING MEANS FOR INSULATOR SUPPORTING PINS

Andrew A. Hocher, Etna, Pa., assignor to Hubbard and Company, a corporation of Pennsylvania Application July 3, 1937, Serial No. 151,880

4 Claims. (Cl. 287—20)

This invention relates to insulator support members of the pin type on which insulators are mounted, and to which, for example, line conductors are secured, and more particularly to means for securing or anchoring such support members to cross arms, wall structures, or other primary supports.

One object of this invention is to provide a new and improved means for securing insulator support pins to primary support structures, for example, poles, walls, cross arms, etc., of the character wherein the support pins are inserted in holes or apertures in the primary support structure and are secured in place in said primary support by means associated with the pins which act on the walls of the holes or apertures surrounding the portion of the pin disposed therein.

Another object of the invention is to provide a device for securing an insulator support pin to a primary support that is particularly applicable to pins that are hollow throughout their entire length, or at least have a hollow portion that extends into the pin hole in the primary support, and which is adopted to be wedged into the wall of the hole surrounding the portion of the pin extending into the same.

Other objects of the invention will, in part, be apparent and will, in part, be obvious from the following description taken in conjunction with the accompanying drawing, in which:

Figure 1 is a view in elevation of a pin provided with a fastening or anchoring device made in accordance with one form of the invention;

Fig. 2 is a fragmentary partial sectional view of the lower end of the pin showing the fastening or anchoring means in front elevation, the section being on line II—II of Fig. 1;

Figs. 3, 4 and 5 are top plan, and front and side elevation views, respectively, of the fastening or anchoring means embodied in the pin of Fig. 1;

Fig. 6 is a fragmentary view showing the lower portion of a pin such as shown on Figs. 1 and 2 mounted in place in a cross arm with the fastening or anchoring means in locking or anchoring position;

Fig. 7 is a fragmentary view of the lower end of a sheet metal blank from which the pin of Fig. 1 is made, the blank being punched to provide wedging surfaces for actuating the locking element shown in detail in Figs. 3, 4 and 5.

Throughout the drawing in the specification like reference characters indicate like parts.

In Fig. 1 of the drawing, there is shown an insulator support pin 1 having at its upper end a thimble or cage 2 on which an insulator (not shown) may be threaded, a flange 3 secured to the shank 4 of the pin and spaced from the bottom of the pin a distance depending upon the depth of hole into which the lower portion is to be inserted, and a fastening, anchoring or locking means 5 associated with the lower end of the pin shank. Locking means 5 is designed and constructed to securely fasten, anchor or lock the pin in position when it is placed in a hole formed either in a cross arm, the side of a telegraph pole or in a wall of a building; or in any other desired or suitable place.

While the pin 1 is illustrated as comprising a single unitary structure made from sheet metal and having a unitary thimble thereon, it is to be understood that the anchoring, fastening or locking means 5 may be employed with other types of hollow pins and that it is not necessary for the thimble to be unitary with the upper end of the pin shank.

The fastening, locking or anchoring device 5 is illustrated more in detail in Figs. 3, 4 and 5, and comprises oppositely disposed wings or lugs 6 and 7 joined at their adjacent ends by a bridging member 8. The lugs or wings 6 and 7 are given a somewhat concave shape in transverse section so as to provide relatively sharp edges as at 9 for effectively cutting into the wall of the hole surrounding the portion of the pin carrying the anchoring or locking device. The anchoring or locking device 5 is carried by the lower end of the pin and to accommodate this locking device the pin is formed on diametrically opposite sides with apertures 10 and 11, the upper ends of which converge toward each other, that is, toward the longitudinal axis of the pin shank, thereby forming wedging surfaces 12—12 and 13—13 at the sides of the respective apertures. These wedging surfaces are tapered from the lower portion of the pin toward the vertical longitudinal axis of the pin.

Locking device 5 is inserted through the apertures to the position shown in Figs. 1 and 2 by suitably manipulating the device as, for example, by turning the device to a position such that the wings or lugs will occupy a substantially horizontal position in which position one wing may be inserted first through one aperture and then the other, and then turning to the position shown in Figs. 1 and 2. When in this position, the opposite sides of wing 6 rest on the inclined support or wedging surfaces 12—12 and the opposite sides of wing or lug 7 rest on the upwardly and inwardly inclined support or wedging surfaces 13—13.

If the pin is made from sheet metal, or at least if the shank portion of the pin is made from sheet metal, the apertures 10 and 11 are preferably formed in the blank while it is in the flat, as shown in Fig. 7. One aperture is formed preferably in the central portion of the blank, and a half of the other aperture is formed along each edge of the blank. The central aperture, as may be seen from Fig. 7, is of somewhat inverted triangular shape with the base of the triangle uppermost and that the half apertures at the edges of the blank represent half of a triangular aperture, such as shown at the center portion of the blank. When the blank is rolled into the round shape, then the two half apertures form one aperture with the seam lying along the altitude of the opening.

When a pin having an anchoring device such as shown and described is inserted in a bored hole of a primary support, such as a cross arm, a telegraph pole, or wall of a building, the pin may be securely anchored to such primary support by merely introducing a rod through the upper end of a pin which is long enough to rest on the bridging member 8 of the anchoring device, and then by driving this rod downwardly with a hammer or other suitable tool the locking device is driven into the wall surrounding the lower end of the pin. As device 5 is driven downwardly, wings 6 and 7 move radially outwardly into the wall of the hole surrounding the lower portion of the pin and pull the pin securely into position. With each blow, the tendency will be to cause the pin to seat more firmly on flange 3 and cause device 5 to more firmly secure the pin in place. The direction of movement of the anchoring or locking device 5 into locking position is shown in Fig. 6.

As illustrated in Fig. 6, wings 6 and 7 are moved outwardly by the wedging action of the surfaces 12—12 and 13—13 into the primary support member, this action being facilitated by the cutting edges 9 thereof.

Pin 1 may be removed from its pin hole especially if the hole is a through hole, by merely introducing the rod above mentioned into the lower end of the pin and driving the rod upwardly against the under side of bridging member 8. By applying a few sharp blows in this direction, wings or lugs 6 and 7 will slide upwardly along the wedging surfaces 12—12 and 13—13 and finally come to the position shown in Fig. 2. When in this position, the outer surfaces of wings and lugs 6 and 7 will lie substantially flush with the outer surface of the pin shank so that the pin may be easily removed from the hole in which it was secured.

Having thus described my invention, what I claim as new and desire to secure by Letters Patent is:

1. An insulator support pin comprising a tubular shank having opposed portions of its walls cut away to form apertures having divergent support surfaces, and a unitary anchor member comprising lugs which are of greater width than said apertures and which normally lie in contact with said support surfaces and within said apertures and an arched bridging member which is narrower than said apertures and which extends through said apertures and the interior of said shank and has its ends joined to the upper ends of said lugs.

2. An insulator support pin comprising a tubular shank having opposed portions of its walls cut away to form apertures having divergent support surfaces located inwardly of the outer surface of the shank, and a unitary anchor member comprising lugs which when in inoperative position lie in contact with said support surfaces and within said apertures and having outer surfaces which are concaved in transverse section to provide spaced cutting edges, and an arched bridging member extending through said apertures, through the interior of said shank and having its ends joined to the upper ends of said lugs.

3. The combination with the tubular shank of an insulator support pin, of means for securing the pin shank within a bore hole of a primary support and which comprises opposed anchoring lugs which are concavo-convex in transverse section, and engage divergent support edges formed on said shank and an arched bridging member which in transverse section is relatively narrower than said lugs, extends through the interior of said shank, and joins adjacent ends of said lugs.

4. An insulator support pin comprising a tubular shank, an element for securing said shank to a primary support and which is movable longitudinally of the shank; said element comprising opposed tapered anchoring lugs located in diametrically opposed notches formed in such shank by providing therein longitudinally extending notches which are narrower than said lugs, and a connecting bridge formed as a unitary part of said lugs and which extends across the interior of said shank; said notches having guiding edges for said lugs which spread the same as said fastening element is moved longitudinally of said shank; said lugs being concavo-convex in transverse section and arranged so that they normally lie in contact with said guiding edges and within said notches.

ANDREW A. HOCHER.